(12) United States Patent
Tong et al.

(10) Patent No.: US 6,777,836 B2
(45) Date of Patent: Aug. 17, 2004

(54) HEAT TRANSFER ENHANCEMENT AT GENERATOR STATOR CORE SPACE BLOCKS

(75) Inventors: Wei Tong, Clifton Park, NY (US); Zhang Qing Zhuo, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 10/302,870

(22) Filed: Nov. 25, 2002

(65) Prior Publication Data

US 2003/0071525 A1 Apr. 17, 2003

Related U.S. Application Data

(63) Continuation-in-part of application No. 09/740,008, filed on Dec. 20, 2000, now Pat. No. 6,498,408.

(51) Int. Cl.$^7$ .......................... H02K 1/32; H02K 15/02; H02K 9/00
(52) U.S. Cl. .................. 310/65; 310/216; 310/60 A
(58) Field of Search .................. 310/58, 59, 60 A, 310/61, 62, 64, 216, 217, 42

(56) References Cited

U.S. PATENT DOCUMENTS

| | | | |
|---|---|---|---|
| 649,574 A | 5/1900 | Foshag | |
| 2,381,297 A | 8/1945 | Lynn | |
| 2,618,756 A | 11/1952 | Fechheimer | |
| 3,116,429 A | * 12/1963 | Harrington et al. | ........... 310/64 |
| 3,597,645 A | 8/1971 | Duffert et al. | |
| 4,028,569 A | 6/1977 | Towne | |
| 4,182,966 A | * 1/1980 | Mishra et al. | ............. 310/59 |
| 4,208,597 A | * 6/1980 | Mulach et al. | ............. 310/59 |
| 4,362,960 A | 12/1982 | Gillet | |
| 5,814,910 A | 9/1998 | Pelletier | |
| 5,869,912 A | 2/1999 | Andrew et al. | |
| 6,498,408 B2 | 12/2002 | Tong et al. | |

OTHER PUBLICATIONS

Co-pending U.S. patent Ser. No. 09/421,180, Generator Stator Core Vent Duct Spacer Posts, filed Oct. 19, 1999.

* cited by examiner

*Primary Examiner*—Tran Nguyen
(74) *Attorney, Agent, or Firm*—Banner & Witcoff, Ltd.

(57) ABSTRACT

A ventilation pathway for a cooling gas to flow extends on a radial axis in a generator stator core. The ventilation pathway comprises at least two magnetic laminations and a plurality of space blocks extending radially in the generator stator core. The space blocks are fastened and disposed between the magnetic laminations. At least one of the space blocks includes a wavy longitudinal profile that includes an alternating pattern of peaks and valleys with respect to the radial axis of the generator stator core. Alternatively, at least one of the space blocks has a plurality of protrusions defining a pattern of peaks and valleys extending from a sidewall of the space block. Several different shapes of vortex generators are punched in the lamination are located within the ventilation pathway.

32 Claims, 17 Drawing Sheets

HEAT TRANSFER ENHANCEMENT AT GENERATOR STATOR CORE SPACE BLOCKS

CROSS-REFERENCE TO RELATED APPLICATION

The present application is a continuation-in-part of U.S. application Ser. No. 09/740,008, filed Dec. 20, 2000 now U.S. Pat. No. 6,498,408, which hereby expressly incorporated by reference.

BACKGROUND OF THE INVENTION

The present invention relates to a generator stator core, more particularly, to a ventilation duct disposed between magnetic laminations of a generator stator core.

The stator core becomes hot during operation of the electric generator and the heat must be removed to keep it from overheating. Cooling the generator stator core is important for reliable generator performance. In the conventional cooling method, the steel core is cooled by a forced-convection flow of air or hydrogen gas via radial space blocks and cooling channels. In general, hot spots usually appear near the tooth tips of the lamination. Conventionally, the gas smoothly flows inside of the cooling channels to remove heat. These spacer blocks are positioned in such a way to assure tightness of the core during assembly and operation, and not impede or restrict the flow of gas through the stator.

A generator stator core is constructed by stacking layers or "laminations" of insulated silicon-iron metal disks together. Inside space blocks or rails are inserted between the layers of the metal disk and these space blocks extend radially from the center of the core. The functions of the inside space blocks are to provide a ventilation passage for a cooling gas and to transfer the weight load due to axial stacking pressure of the laminators. The space blocks are spaced at regular intervals around the circumference of each metal disk. On a conventional stator lamination 1 of arcuate shape, inside space blocks 2 are typically arranged radially and have a cross-section or profile resembling small I-beams. These I-beam shaped space blocks are spot welded to stator lamination, FIGS. 1 and 2. The space blocks are made from one of several thermally conductive materials such as low carbon steel, silicon-manganese bronze, or stainless steel.

Several attempts for enhancing local heat transfer and reducing hot spot temperature in the stator core were made previously. The following patents and applications are hereby incorporated by reference. U.S. Pat. No. 5,869,912 "Direct-Cooled Dynamoelectric Machine Stator Core with Enhanced Heat Transfer Capability" describes the use of a turbulator element on in ventilation ducts. The spacer blocks have a straight longitudinal profile. Commonly-assigned, co-pending U.S. patent application Ser. No. 09/421,160, filed on Oct. 19, 1999 describes the use of cylindrical compact posts to maximize the flow area for the cooling gas U.S. Pat. No. 4,362,960 "Spacer Assembly for a Stator Venting Duct of an Electric Power Machine," describes slightly curved spacer members having a rectangular profile. While these past attempts alleviate the hot spot problems to some extent, the past space block shapes and the straight radial configurations do not take maximum advantage of heat transfer principles. Since the search is on for improved generator performance, there is a particular need to enhance the heat transfer in a generator stator core.

SUMMARY OF THE INVENTION

The present invention pertains to structural arrangements and methods for improving heat transfer in a generator stator core.

According to the present invention, the some embodiments are based on two fundamental heat transfer principles: imparting turbulence to the flow and increasing the convective surface area. One way that enhanced cooling is achieved is in the arrangement of the space blocks. In general, the space blocks, which were conventionally arranged in more or less straight lines, are configured in undulating arrangements, such as a zigzag pattern or a sinusoidal pattern. These configurations force the cooling gas to change direction as it makes its way through the pathway. This disturbance in the flow enhances the cooling of the stator core. Another way to enhance cooling is to change the cross-sectional shape of the space blocks to provide more surface area to promote heat transfer. These two main principles are applied in various permutations to enhance the cooling results of the cooling gas.

In one aspect of the present invention, at least one of the space blocks extends radially extending ventilation pathway includes a longitudinal profile that is defined by an alternating pattern of peaks and valleys. Thus, the cooling gas is influenced to periodically change its direction along the flow path adjacent to the longitudinal profile.

In another aspect of the present invention, a cooling channel extending on a radial axis in a generator stator core for a cooling gas to flow therethrough, comprises axially adjacent stacked lamination in which at least two adjacent space blocks inserted between the stacked laminations. The space blocks extend on the radial axis in the generator stator core. At least one of the space blocks has a plurality of protrusions defining a pattern of peaks and valleys extending from a sidewall of the space block. In this way, the convective contact area of the space block is increased efficient removal of additional heat from the generator stator core.

In yet another aspect of the present invention, a space block for forming radially disposed cooling channels in a generator stator core is provided. Another example is a space block that includes a wavy longitudinal profile for causing local separation and reattachment of the cooling gas boundary layer along the wavy longitudinal profile. Thus, additional heat is removed from the generator stator core.

In another aspect of the present invention, an effective way to enhance convective heat transfer at the stator core space blocks is to use roughened geometries or structures on heated surfaces.

According to another aspect of the present invention, enhanced heat transfer is realized by providing a cooling fluid passage that has a roughness geometry arrangement configured to act as turbulence promoters to increase the rate of heat transfer from the space block to the cooling fluid. In one arrangement the roughness geometry may be formed as a knurled surface.

In yet another aspect of the present invention, a cooling gas ventilation circuit for a generator stator core includes a radial axis extending from a center and comprises at least two laminations and a plurality of adjacent space blocks. The adjacent space blocks are thus disposed between the laminations forming a ventilation duct for a cooling gas to flow through. A heat transfer surface may extend along of the ventilation duct such that at least a portion of a heat transfer surface of the ventilation duct has a knurled pattern. In one arrangement, the heat transfer surface may be formed on a side surface of a space block so as to have a surface profile for enhanced heat transfer. In this way, the thickness of the boundary layer of the cooling fluid adjacent to the sidewalls is reduced and a convective heat transfer coefficient is significantly increased. According to one aspect of the present invention, at least one space block includes knurled sidewalls.

In another aspect, there is provided a space block with thermal passages that extend between adjacent ventilation ducts to increase cooling capacity. In this manner, the cooling gas may exchange between the adjacent cooling channels or ducts so that more uniform heat transfer rate can be achieved over conventional generator stator cores.

In one aspect, a plurality of three-dimensional roughness elements are provided on the lamination surfaces to enhance cooling of the stator core. In one aspect, vortex generators or turbulence promoters are provided on the laminations between the space blocks. As the cooling fluid flow passes over the vortex generators, a several three-dimensional horseshoe vortices are generated in a stagnation area proximate to the vortex generators and the flow separates in the wake of the generators.

The present invention advantageously augments the heat transfer for a generator stator core by increasing the cooling capacity at the stator core. Localized hot spots are greatly reduced by the invention. The generator output rating is increased because the stator temperature is controlled at the lower temperature than conventional cooling systems.

These features and advantages of the present invention will be apparent upon consideration of the following detailed description thereof, presented in connection with the following drawings in, which like reference numerals identifying the elements throughout.

DETAILED DESCRIPTION OF THE INVENTION

Figure 1:
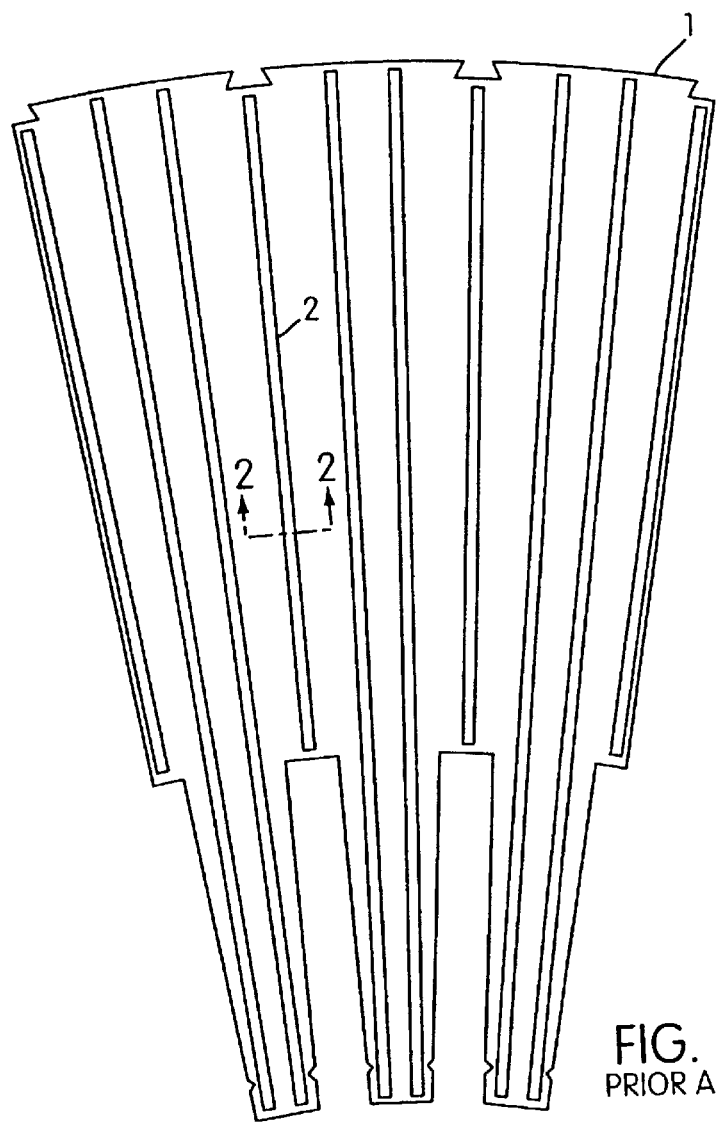
FIG. 1 is a side elevational view of a conventional generator stator lamination and inside space blocks.

Referring to FIGS. 3–6, a number of exemplary embodiments of the invention are illustrated. In all of the FIGS. 3–6, a plurality of ventilation pathways or cooling channels 10 are disposed on a generator stator core lamination 12. A plurality of inside space blocks 14 extend radially from the center of the stator core and the space blocks are inserted between laminations 12. The longitudinal and cross sectional profile of inside space blocks 14 are designed to increase heat removal from the stator core. In addition, a plurality of vortex generators 16 are disposed within or inside of the cooling channels. A cooling gas, such as air or hydrogen, is injected into the cooling channels 10 to remove the heat created in the stator core. The embodiments of the present invention provide three-dimensional flow disturbance elements within the cooling channel to disrupt the gas flow near the interior surfaces. Through the use of computation fluid mechanics, the results demonstrate that the overall heat transfer coefficient from the gas flow can be doubled or tripled with these designs. Thus, the generator stator core can be ventilated more efficiently than conventional designs.

The space blocks are generally separated at regular intervals around the circumference of lamination 12. The cooling channels are defined by the interior space disposed between at least two adjacent space blocks 14 inserted between at axially adjacent stacked laminations 12. In the exemplary embodiments shown in FIGS. 3–6, the flow of the cooling gas is disrupted where the cooling gas flows proximate to the inside surface of the cooling channel, e.g. the side surface 18 of the space blocks and the surface 20 of the laminations. Each space block 14 has a longitudinal profile being defined by a function that creates an alternating pattern of peaks and valleys with respect to a radial axis or the radial direction of the generator stator core.

One way that the present invention achieves enhanced heart transfer as confirmed with computational fluid mechanics is to impart disturbances to the flow. Referring to the embodiments illustrated in FIGS. 3 and 5, due to the undulations of the space block, the cooling gas is influenced to periodically change its direction along the flow path adjacent to longitudinal side surface 18 of space blocks 14. This causes local flow separation disturbances and subsequent reattachment of gas flow in the boundary layer. In addition, the redeveloping boundary layer from the reattachment point also contributes to heat transfer enhancement. In this way, the disturbances in the cooling gas flow by the longitudinal side surface advantageously reduces the thickness of the boundary layer and as a consequence, increases the effective heat transfer coefficient. Thus, additional heat is removed from the stator core.

Figure 3:
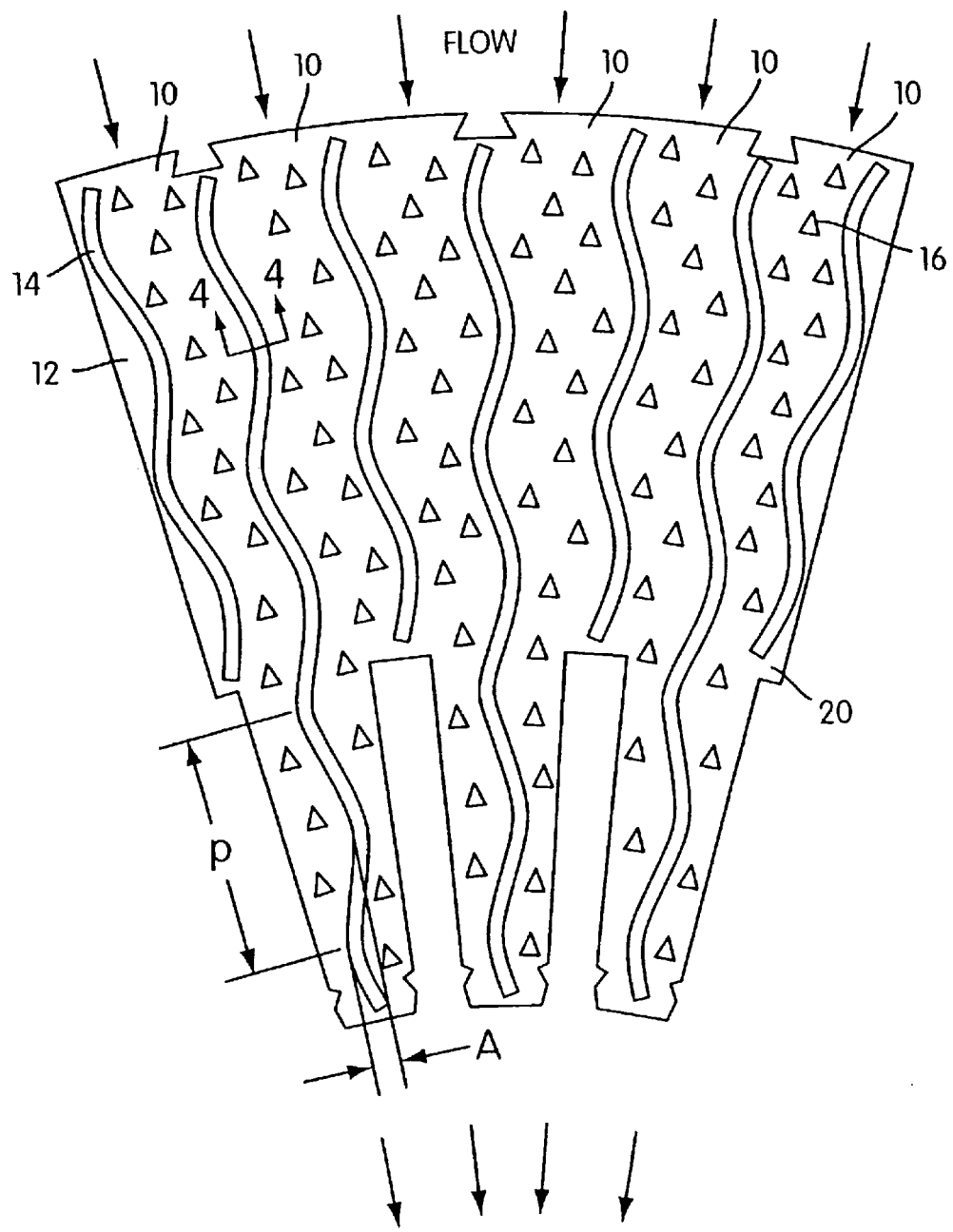
FIG. 3 is a side elevational view of an exemplary embodiment of a stator core lamination assembly with undulating space blocks and vortex generators according to the teachings of the present invention.

FIG. 3 illustrates a longitudinal profile of an exemplary embodiment of space blocks 14. Space blocks 14 have a wavy type of longitudinal profile. One wavy type can be defined by a sinusoidal function. This longitudinal profile can be expressed as $y = A\sin(\omega x)$, where y is height of the profile with respect to an axis that is perpendicular to the radial direction; x is a reference dimensional point in the radial direction, A is a user selectable amplitude parameter of the profile, and $\omega$ is a user selectable angular frequency parameter. In addition, the distance between alternative valleys or peaks can be defined as $p = 2\pi/\omega$. It should be appreciated that the aforementioned amplitude parameter A, and angular frequency parameter ω can be optimized accordingly by one skilled in the art for the characteristics of the intended generator stator core. The present invention is not limited to a sine function as illustrated, but other functions such as, a cosine function or an equation involving sine and cosine or equivalents thereof may be employed.

Figure 5A:
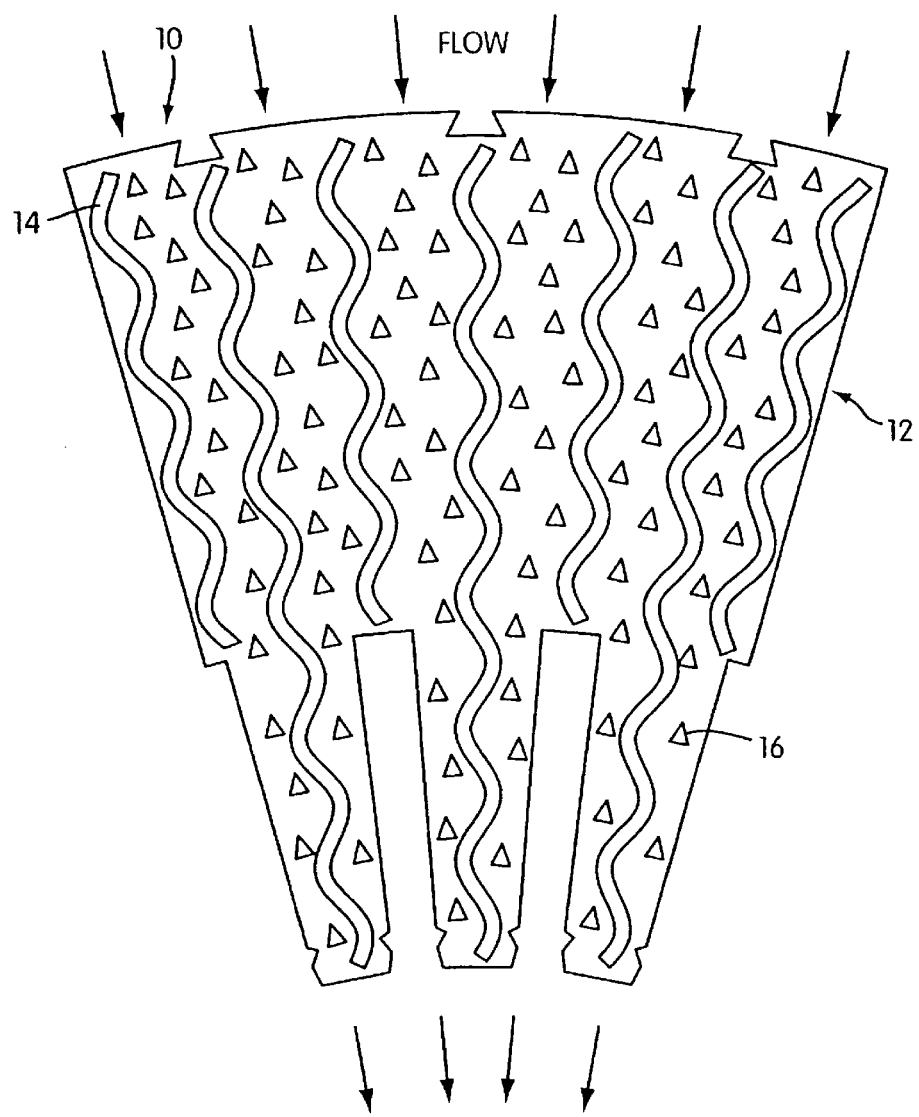
FIGS. 5A–5B are side elevational views of other embodiments of the stator core lamination assembly according to the teachings of the present invention.
Figure 5B:
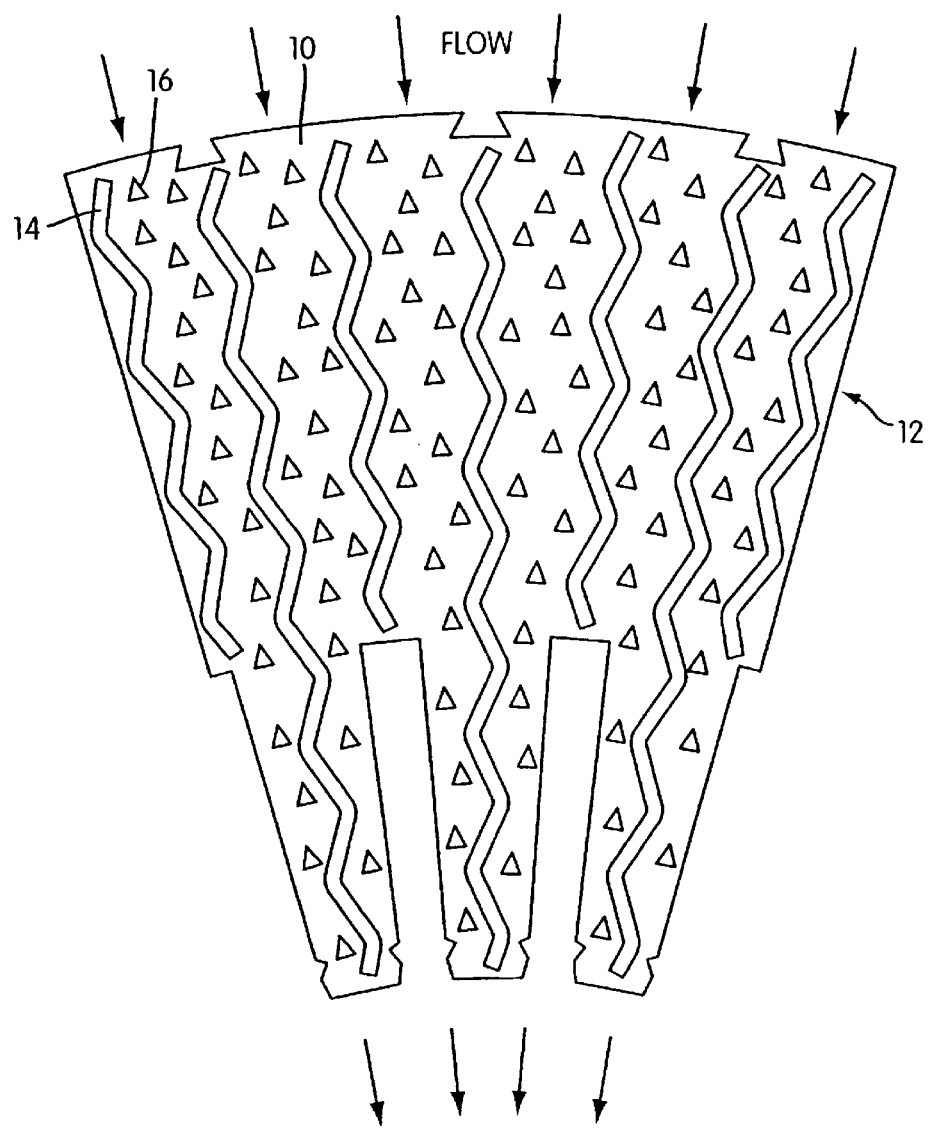

Variations of alternative wavy types of longitudinal profiles are illustrated in the exemplary embodiments shown in FIGS. 5A and 5B. In these embodiments, the profile performs the same purposes as previously explained for the embodiment shown in FIG. 3. Now referring FIG. 5A, the longitudinal profile of inside space blocks 14 can also have a small angular frequency. Thus, the number of peaks and valleys can be controlled for the specific desired amount of heat removal. Alternatively, as shown in FIG. 5B, the longitudinal profile of the space blocks is not limited to a wavy or sinusoidal shape, but may have a more pronounced alternating valley and peak arrangement.

Figure 6A:
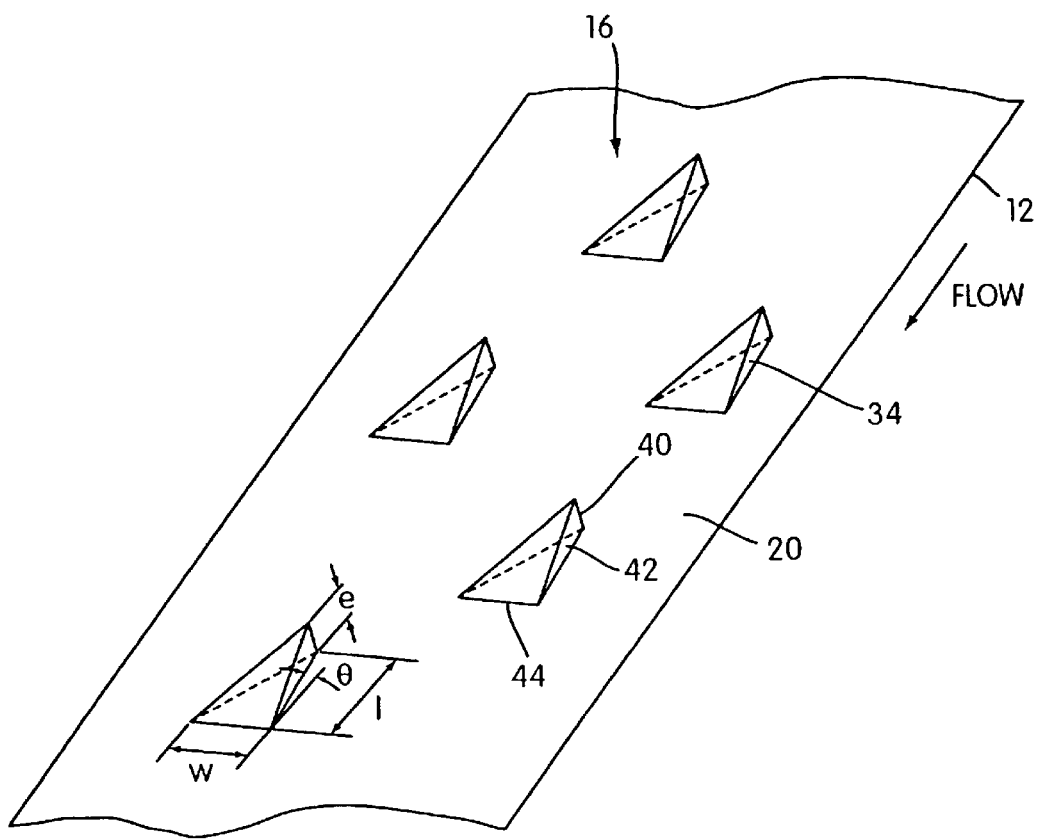
FIGS. 6A–6C are perspective views of exemplary embodiments of the vortex generators according to the teachings of the present invention.
Figure 6B:
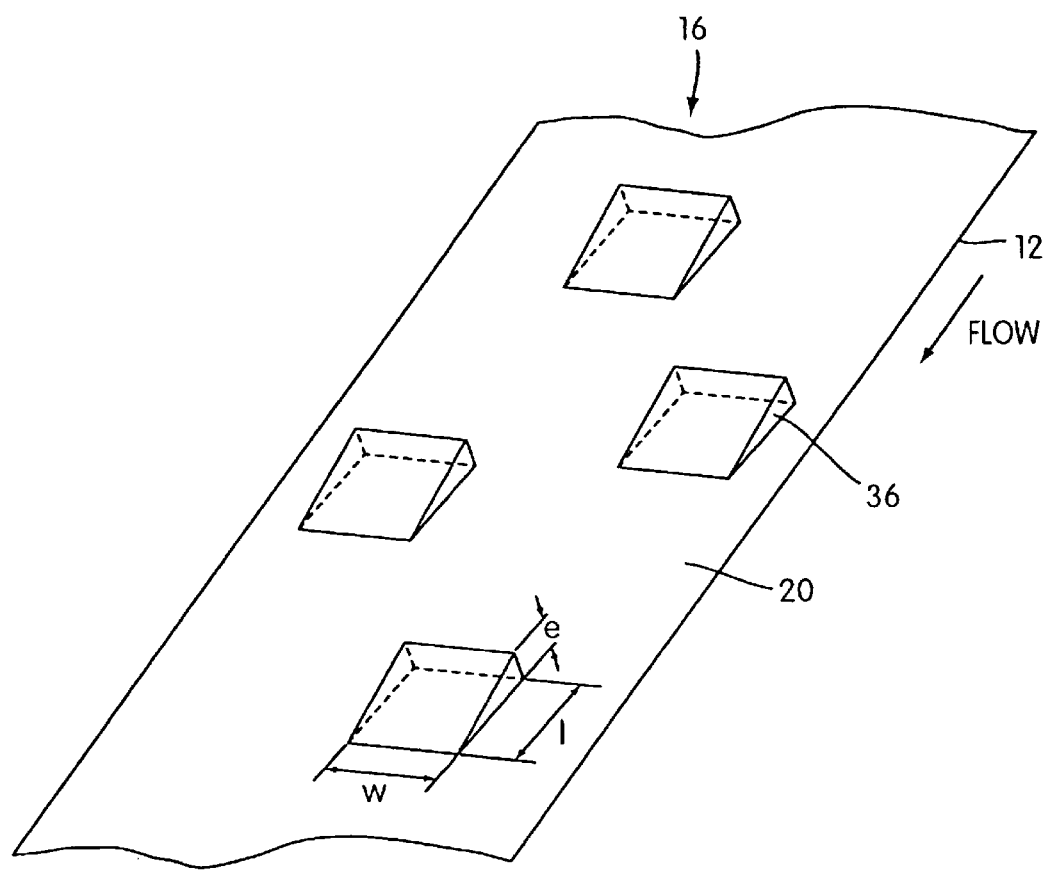
Figure 6C:
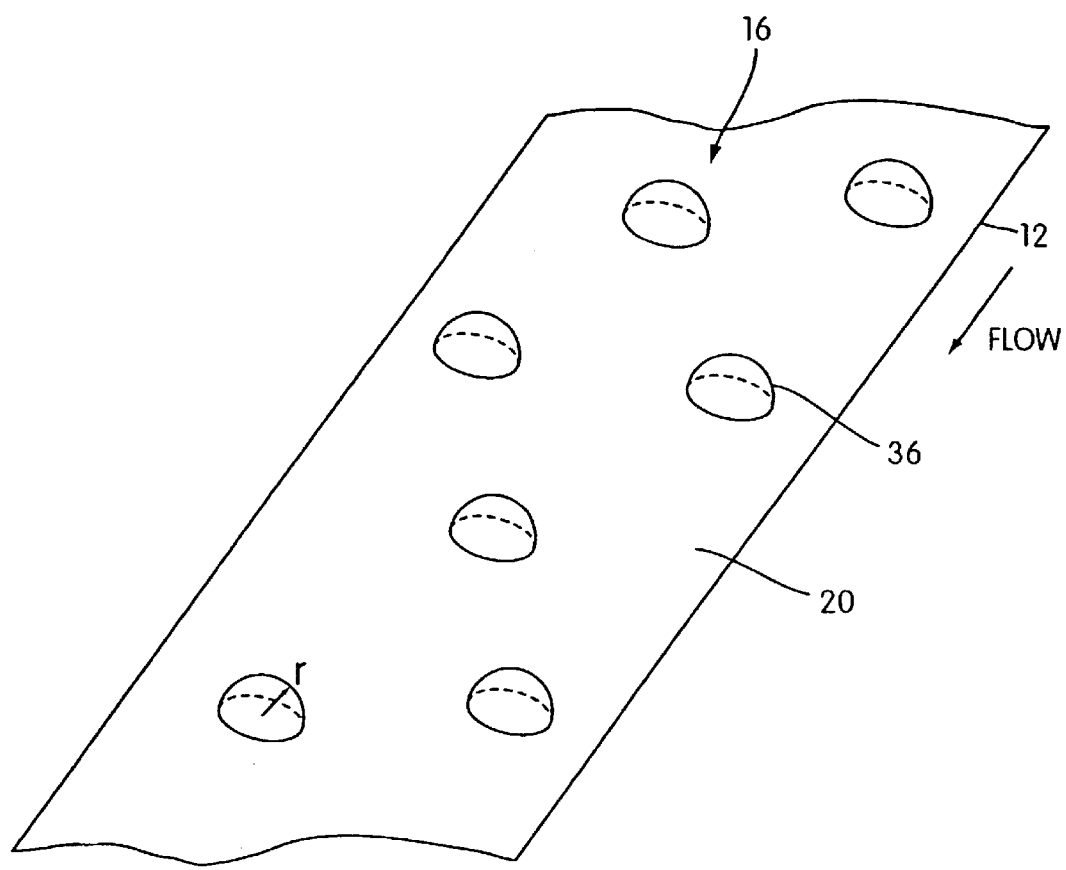

Another way of imparting disturbances to the flow is to employ vortex generators 16 in combination with the wavy space blocks. Referring the FIGS. 6A–6C, three types of exemplary vortex generators or turbulence promoters are shown. A plurality of delta-shaped protrusions 34 are illustrated in FIG. 6A, wedge-shaped protrusions 36 are shown in FIG. 6B, and hemisphere-shape protrusions 38 are shown in FIG. 6C. The vortex generators can be applied in a generator stator core for cooling by punching a plurality of delta-shaped, wedge-shaped, or hemispherical protrusions on laminations 12. In operation, as the cooling gas flows over these protrusions, a number of vortices are generated either at the sides of the protrusions and above the protrusions, for delta-shaped protrusions, or at the front and above the ribs, for wedge-shaped protrusions, and the flow separates in the wake of the protrusions. This arrangement is advantageous for cooling channels because both laminations receive cooling effect—the bottom surface and the top surface. These generated three-dimensional vortices can maximize the heat transfer rate between the heated surfaces and cooling gas. The vortex generation and propagation highly disturbs the cooling gas boundary layer and greatly enhances the surface heat transfer coefficient in relation to the lamination. The experimental results have shown that the interference between the protrusions plays an important role in the thermal and flow fields.

Referring to FIG. 6A, each delta-shaped protrusion comprises a leading edge 40, a body 42, a trailing edge 44. The body of each delta-shaped protrusion is characterized by a protrusion height e, a width w, a length l, and a delta angle θ. Leading edge 40 is defined by protrusion height e is located at the apex of the delta-shape protrusion. Trailing edge 44 is disposed at the base of the delta-shape. Each delta-shaped protrusion is oriented against the flow direction so that heat transfer to the cooling gas is enhanced. Leading edge 40 meets and separates the cooling gas flow so not to create a relatively high-pressure drop. The orientation can be considered a backwards flow direction instead of a forward flow direction.

Referring to FIG. 6B, the wedge-shaped protrusion is characterized by rib height e, width w, and length l. Referring to FIG. 6C, the hemispherical protrusion is defined by radius r. It should be appreciated that the aforementioned protrusion height e, width w, length l, delta angle θ and radius r can be varied accordingly for the characteristics of the intended generator stator core. It has been determined that delta-shaped protrusions 34 produce a higher heat transfer augmentation and lower pressure drop penalty that of the wedge-shaped protrusions.

A significant pressure drop penalty is caused when sequential vortex generators are aligned along a radial axis in the direction of the cooling flow. In the embodiments illustrated, the pressure drop penalty is reduced by staggering rows of the ribs on the lamination. The desired number of vortex generators on the lamination depends upon a proportionate function between the heat transfer enhancement and introduced pressure drop. Thus, the desired amount of heat removal can be controlled.

Figure 4A:
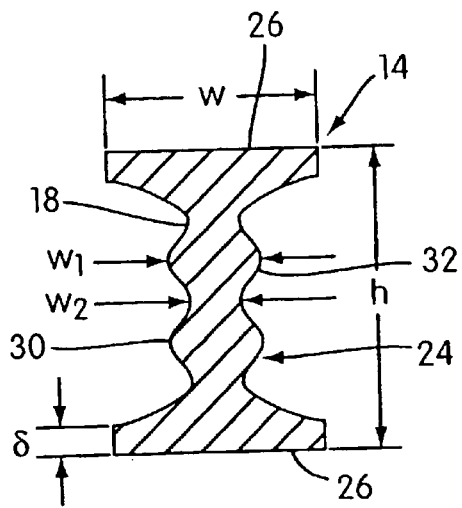
FIGS. 4A–4E are sectional views of exemplary embodiments of a space block of FIG. 3 according to the teachings of the present invention having a profile taken along section line 4—4.
Figure 4B:
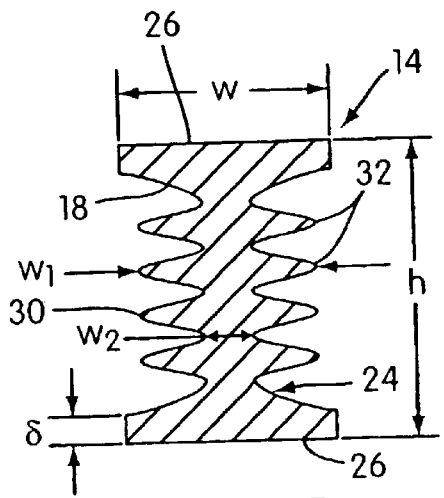
Figure 4C:
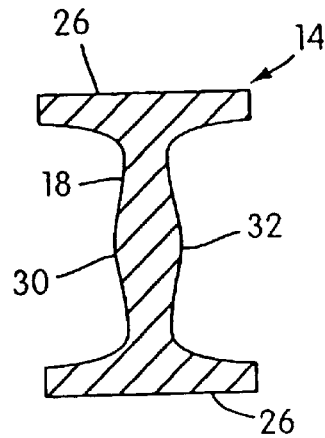

Another way of enhancing heat transfer is to increase the surface area of space blocks exposed to the cooling gas. FIGS. 4A–4C illustrates, exemplary embodiments of symmetric profiles of space blocks 14. As the cooling gas flows through cooling channels 10, a convective contact area 22 of the space blocks functions as heat transfer surfaces and act as thermal fins. Convective contact area is herein defined as the surface area of the space block that is used for heat transfer. It should be appreciated that surface area may be calculated by using the peripheral longitudinal length of the space block multiplied by the peripheral measurement of the sidewall. It has been determine by computational fluid dynamic analysis that the symmetric profiles shown in FIGS. 4A–4C, can increase heat transfer by about 5–20%, when compare to the conventional space block design shown in FIG. 2.

Each space block comprises a web member 24, two opposing flanges 26 being substantially parallel, an axis 28 extending between the flanges 26, and angle of inclination φ. The angle of inclination is measured relative to the axis 28 and at least one of the opposing flanges 26. Web member 24 includes two opposing sidewalls 30 extending between the opposing flanges and configured substantially perpendicular. The width and thickness of the opposing flanges are defined by w and δ, respectively. Sidewalls 30 include a plurality of thermal extensions 32 for transferring heat to a cooling gas. Thermal extensions 32 are defined by a plurality of protrusions that create a pattern of peaks and valleys on the sidewalls. As can be seen in FIGS. 4A and 4B, a peak on the sidewalls may be defined by a protrusion having width in web member 24 defined by $w_1$, and valley is may be defined by the width in the web member defined by $w_2$, where $w_1$ is greater than $w_2$.

Figure 2:
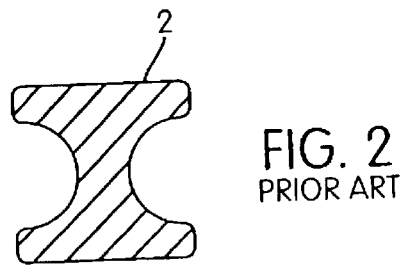
FIG. 2 is a sectional view of a conventional inside space block taken along line 2—2.

In the embodiments shown, the convective contact area on the sidewalls of the web member is varied for the desired amount of heat transfer. For symmetric space blocks, the heat transfer coefficient increases from FIGS. 4A to 4B, due to the increased convective contact area between the flowing cooling gas and the space block 14. The present invention advantageously increases the convective contact area for heat transfer over conventional space blocks such as shown in FIG. 2. In addition, the convective contact area can be increased by creating a single thermal extension in sidewall of the space block embodiment shown in FIG. 4C. The concept of creating a plurality of thermal extensions as shown in FIGS. 4A and 4B create yet a greater amount of convective contact area. It should be noted that the embodiment of space block 14 shown in FIG. 4B has the greatest convective contact area in the sidewalls and also the greatest amount of heat transfer efficiency.

Figure 4D:
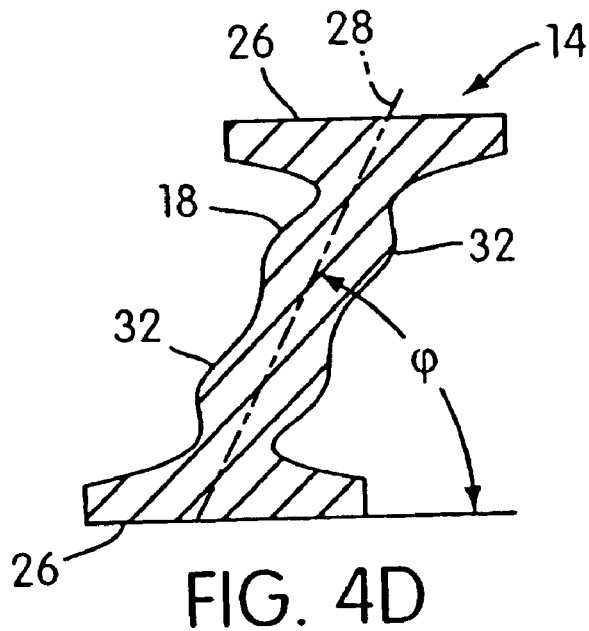
Figure 4E:
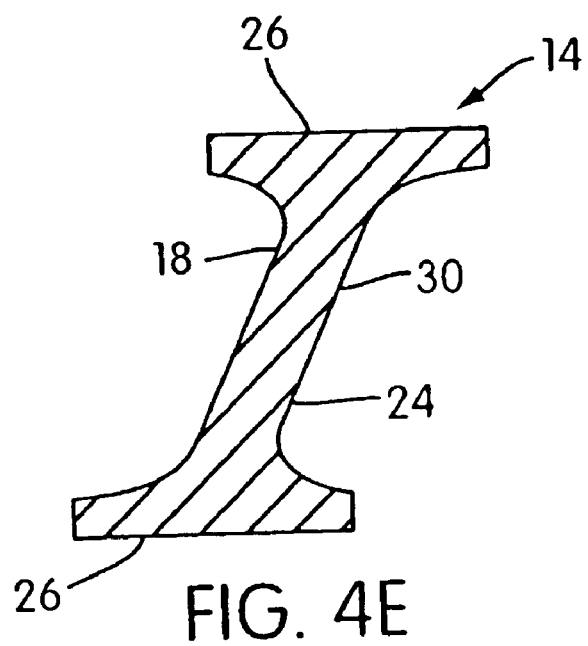

FIGS. 4D and 4E illustrate exemplary embodiments of asymmetric profiles of the space blocks. The embodiment shown in FIG. 4D is similar to the embodiment shown in FIG. 4A, except the angle of inclination is less than 90 degrees. Accordingly, thermal extensions 32 are included on the sidewalls of the space block. Alternatively, the embodiment shown is FIG. 4E does not include thermal extensions. Accordingly, the asymmetric profile of the space blocks shown in FIG. 4D is preferable over the embodiment shown in FIG. 4E. While, symmetric fins generally perform better than asymmetrical fins, it has been determined that if the thermal extensions are spaced far apart, asymmetric block profiles result in enhanced performance over symmetrical space block. This is mainly due to the larger extension of the convective contact area between solid and liquid in the cooling gas. It is recognized that the space blocks also function as support members between the laminations. Accordingly, the determination of the space block angle of inclination φ varies as a function of a portion between the magnitude of heat transfer desired and the resultant bending stresses on both the space blocks and lamination. In the exemplary embodiments of asymmetric profiles of the space blocks, the angle of inclination φ can range between 60 to 90 degrees.

The present invention contemplates multiple variations of space block configurations which direct cooling gas flow in a nonlinear motion. Any combination of space blocks in a pattern of peaks and valleys with the enhanced convective area profiles is contemplated to be within the scope of the invention. The finned profiles may also be used advantageously with conventionally arranged straight space blocks if the desired increase in heat transfer can be achieved by changing the cross-sectional shape only.

FIGS. 7 and 8A–8D illustrate exemplary embodiments of the present invention, in which enhanced heat transfer is realized by providing a cooling fluid passage that includes a roughness geometry arrangement configured to act as turbulence promoters. In this manner, the rate of heat transfer from the space block to the cooling fluid is augmented.

In one embodiment, a cooling gas ventilation circuit for a generator stator core may include a radial axis extending from a center and comprises at least two laminations and a plurality of space blocks. A heat transfer surface may extend along of the ventilation duct such that at least a portion of a heat transfer surface has a thermal roughness geometry arrangement. In one arrangement of the present invention, a heat transfer surface may be formed on a side surface of a space block so as to have a surface profile for enhanced heat transfer. In this way, the thickness of the boundary layer of the cooling fluid adjacent to the sidewalls is reduced so as to significantly increase a thermodynamic convective heat transfer coefficient.

Figure 7:
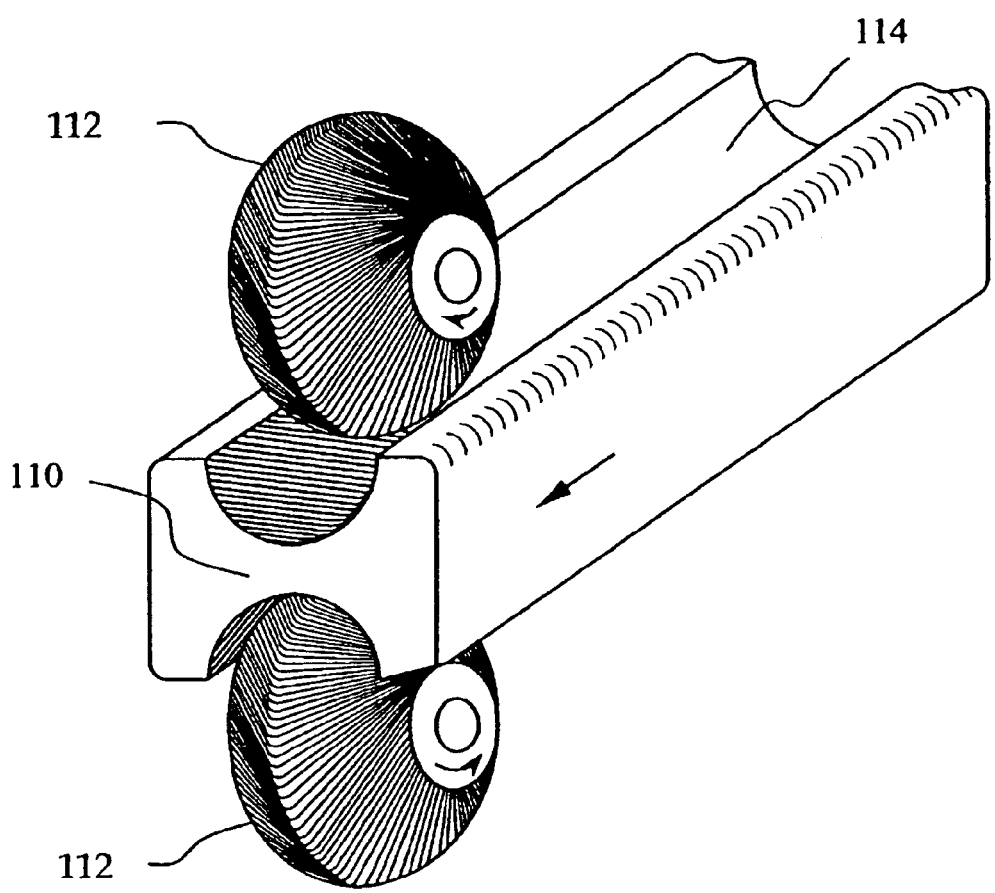
FIG. 7 is a perspective view of a knurling process applied to a space block sidewall according to the teachings of the present invention.
Figure 8A:
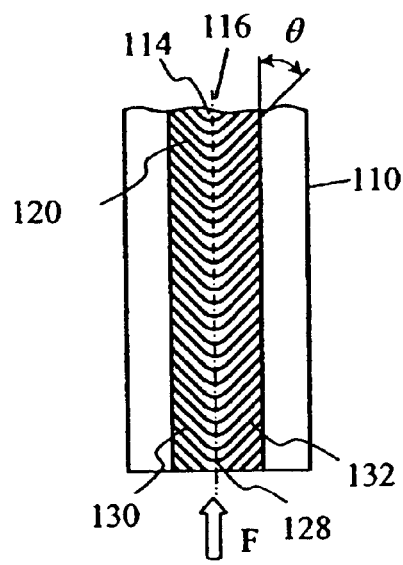
FIGS. 8A–8E are elevational views of roughness geometry structures according to the teachings of the present invention.
Figure 8B:
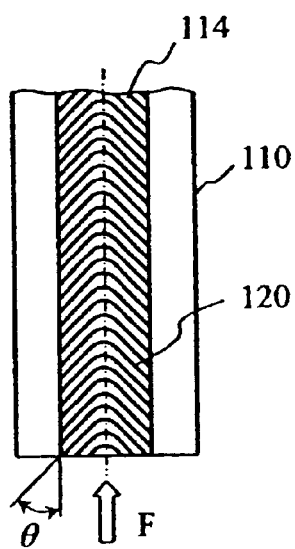
Figure 8C:
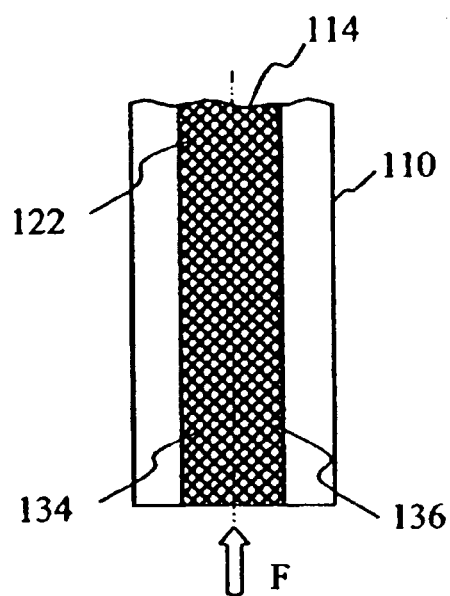
Figure 8D:
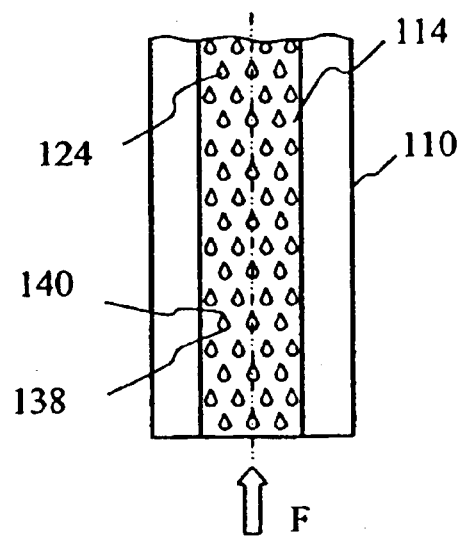
Figure 8E:
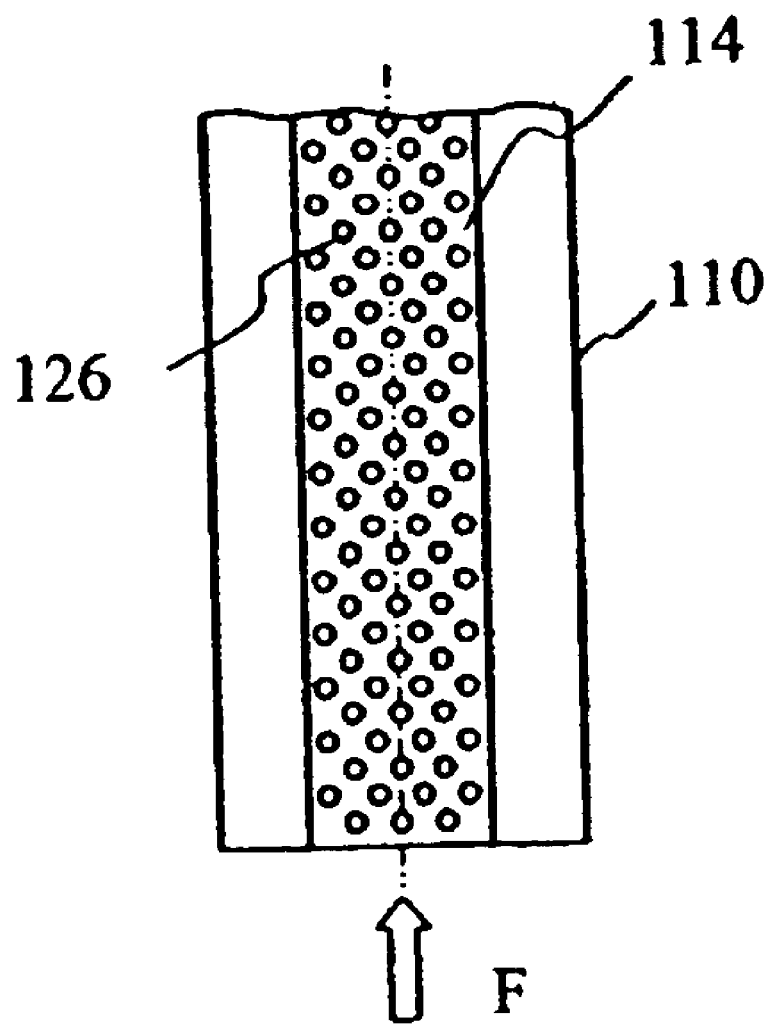

Referring to FIG. 7, one arrangement of the present invention is illustrated with a pair of wheels 112, such as knurling wheels, configured to provide a thermal roughness structure embodied in a knurled pattern. Pair of knurling wheels 112 include oblique cutting ribs or distinct protrusion ribs on their walls. The wheels 112 are forced into abutment with the sidewalls 114 of the space block 110 to form a heat transfer surface with various knurling patterns so as to increase the cooling performance in the stator core. Several knurling patterns, including a rib type and a dimple type pattern, are illustrated in the embodiments illustrated in FIGS. 8A–8E, wherein V-shaped ribs 120 are shown in FIGS. 8A and 8B; web-shaped ribs 122 are illustrated in FIG. 8C; raindrop-shaped dimples 124 are shown in FIG. 8D; and hemisphere dimples 126 are depicted in FIG. 8E. The height of the ribs 120, 122, and 124 ranges from 0.05 to 1 mm. In one arrangement, the rib density may preferably range from 3–180 ribs/cm. Alternatively, the rib density may range from 10 to 100 ribs/cm. The specific ribs density is useful for trimming and adjusting desired heat transfer characteristics for the stator core. This may include computational fluid mechanics to fine tune the heat transfer coefficient.

Referring to FIG. 8A, a plurality of the V-shaped ribs 120 are knurled on the sidewall 114 of the space block 110. As illustrated, the V-rib configuration has an apex 128 and first and second legs 130 and 132, each leg being defined at an angle θ with respect to a longitudinal axis 116 of space block 110. This configuration causes a generally local bi-directional flow characteristic in that the flow tends to be dissipate outwardly from the centerline, axis 116, towards the two legs of the ribs. This outward bi-directional flow causes more cooling fluid to flow towards the two adjacent laminations forming the cooling channel. In this way, cooling efficiency can be increased by reducing the boundary layer of the cooling fluid and by directing the flow for enhanced conduction for heat transfer towards the laminations.

It should be recognized that space block 110 when assembled in the stator core axis 116 may be considered a radial axis of the stator core. Nevertheless, the cooling gas generally flows along axis 116 as indicated by a directional arrow "F" or alternatively in the opposing direction. According to the present invention, an enhanced heat transfer ratio may be a general function of the rib angle θ, and rib height. The rib height is defined from the free end of the rib extending in the cooling fluid flow to the opposing base end attached to the space block 110. The rib angle θ may be preferably in the range of approximately 45°–90°. For ease of explanation, a rib angle θ of 90 degrees refers a direction that is transverse or generally normal to the longitudinal axis 116. In such an arrangement of 90° rib angle, the ribs 120 would be in a straight configuration or be perpendicular to axis 116.

FIG. 8B shows a similar pattern to FIG. 8A, but having an opposite orientation with respect to the flow redirection. A cooling flow in the configuration generally illustrated in FIG. 8B may be characterized as an inward directional flow which causes cooling fluid to flow centrally towards the sidewall centerline, e.g. axis 116. As shown by computational fluid mechanics, heat is transferred from the laminations to space blocks by conduction. Nevertheless, the outward bi-directional flow configuration shown in FIG. 8A has a higher cooling capacity than the inward flow configuration shown in FIG. 8B. The web-shaped ribs are illustrated in FIG. 8C. The web is formed from the combination of a plurality of the left oblique ribs 134 and right oblique ribs 136. This creates a generally uniform flow dispersion pattern across the surfaces. While, knurled patterns are illustrated, the ribs may be formed by machined, casted, and/or molded methods. Manufacturing production efficiency can be increased in a casted or molded arrangement of the space blocks with the ribs by significantly eliminating machining processes to cut the ribs in the space block sidewalls.

As schematically illustrated in FIGS. 8D and 8E, in another arrangement of a heat transfer surface on the space block 110, at least a portion of the surface includes a roughness structure with concaved thermal protrusions that extend into the flow path of the cooling fluid. The plurality of concavity surfaces as generally depicted in FIGS. 8D and 8E provide heat transfer enhancement while exhibiting drag reduction advantages in the cooling flow. Computational fluid mechanics has shown that a raindrop-shaped dimple 124 arrangement as generally shown in FIG. 8D and a hemisphere dimple 126 arrangement as generally depicted in FIG. 8E, respectively, can increase the heat transfer rate by at least 2.2 to 2.5 times that of a comparable generally smooth surface on a space block. This noted heat transfer enhancement is similar to that provided by ribs 120 and 122. The added benefit of using the dimple arrangements 124 and 126 is that the pressure drop of the fluid is less by a factor of 2 to 3 as compared to the ribs 120 and 122. Hence, dimples arrangements 124 and 126 substantially increase the efficiency of the cooling process with a minimal pressure drop. Advantageously, the lower pressure drop reduces the input energy needed to impart flow of the cooling fluid though the stator core. In one example, the lower pressure drop provided by the dimples results in saved operational costs because of lower energy consumption needed for pumping the cooling fluid through the stator core. As illustrated in FIG. 8D, each of the raindrop-shaped dimples 124 have a rounded end 138 and a generally pointed end 140, the pointed end 140 is generally the downstream end of the dimple with respect to the cooling flow direction F to further reduce the pressure drop.

Figure 9:
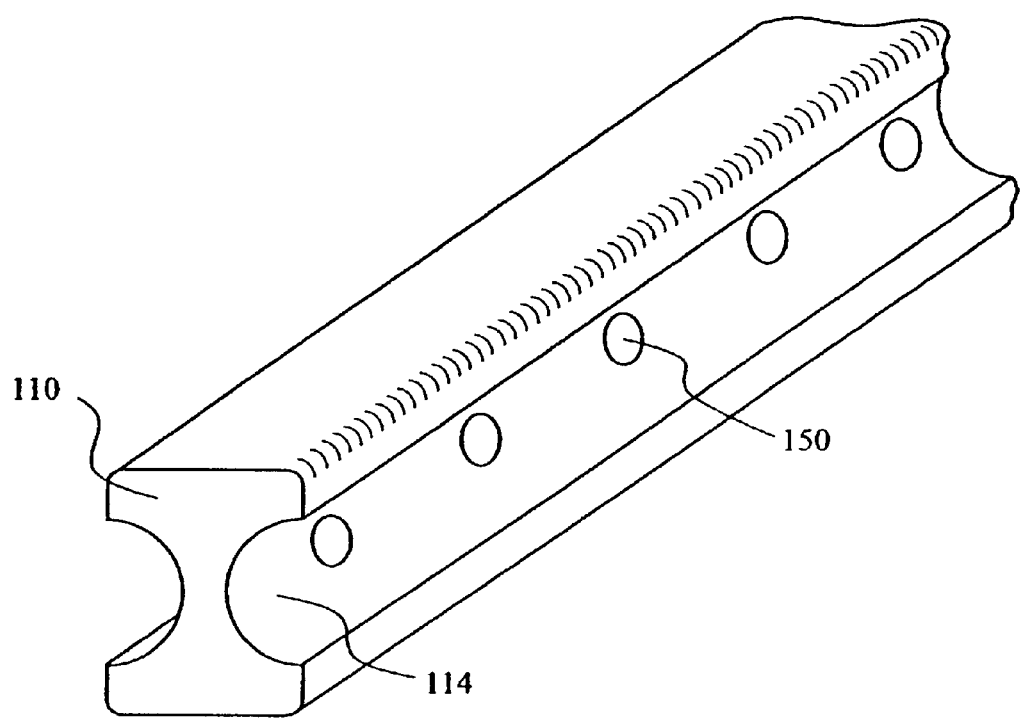
FIG. 9 is a perspective view of the ventilation apertures disposed in a space block sidewalls according to the teachings of the present invention.

Referring to FIG. 9, at least one or more thermal orifices, apertures or fluid passageways 150 are provided in a sidewall 114 of space block 110 to improve the heat transfer rate in the stator core. Nevertheless, it is recognized that the space block 110 can be structural load bearing component. Therefore, a balance is maintained between the shape and size so as to minimize localized stress in the space block 110 to perform the load bearing task. The thermal apertures 150 may be virtually any shape and extend through the web member 152. In the arrangement shown in FIG. 9, the thermal apertures 150 have a circular shape. Conventional methods, such as machine drilling, may be used to create the circular shape. Alternatively, thermal apertures 150 may be created when the space block is casted, molded or the like, to increase manufacturing efficiencies. By way of example, the diameter of the thermal apertures 150 may range between 2 and 8 mm. Nevertheless, other diameters are possible for the apertures.

In one arrangement of a space block, the thermal apertures 150 may be distributed uniformly spaced along the central longitudinal axis 116 of the space block 110. Thermal apertures 150 may be perpendicular or have an angle to the axis of the space block 110. In these arrangements, the cooling fluid, in particular cooling gas, can exchange between adjacent channels so that an improved heat transfer rate reduces local hot spots in the stator core. Accordingly, these aspects of the present invention achieves a more uniform heat transfer rate than that of past generator stator cores without the thermal apertures. While a generally smooth sidewall 114 is illustrated in FIG. 9, thermal apertures 150 may be provided with the roughened geometries of space block 110 shown FIGS. 8A–8D as well. If desired, thermal apertures 150 can be applied to space blocks 14 shown FIGS. 4A–4E in straight or wavy shaped configurations.

Figure 10:
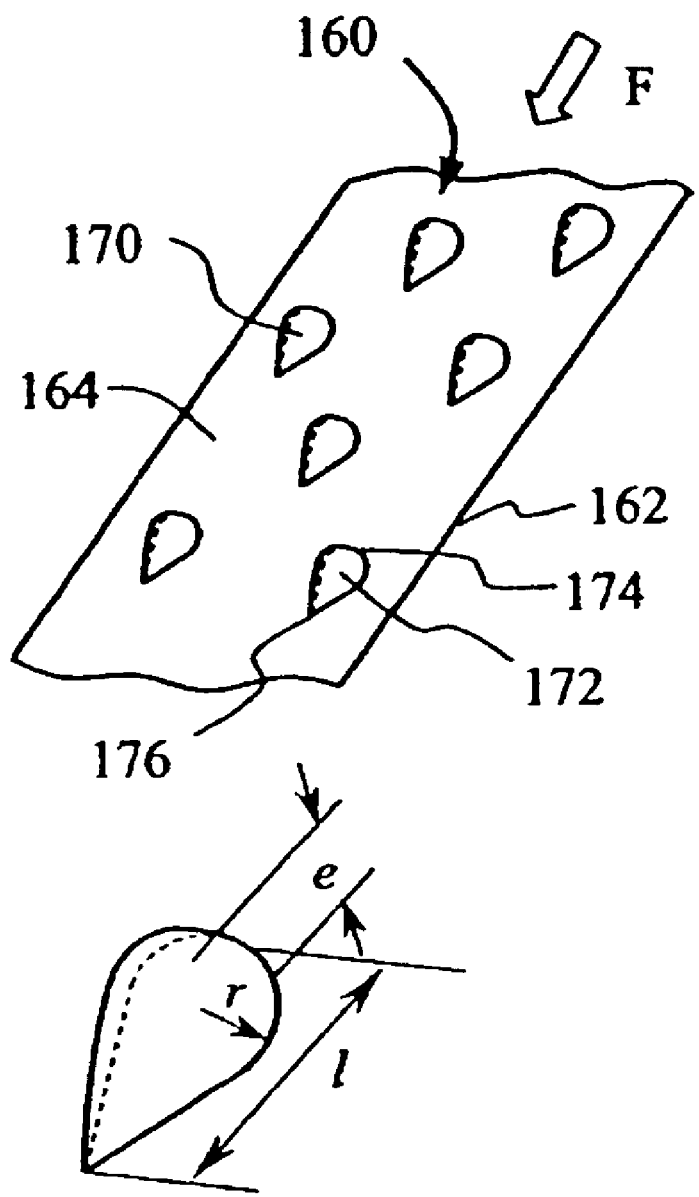
FIG. 10 is a perspective view of a vortex generator arrangement according to the teachings of the present invention.

An alternative structure to enhance convective heat transfer at the stator core space blocks is to use as vortex generator at the space blocks. FIG. 10 illustrates a plurality of vortex generator or turbulence promoters adapted for improving heat transfer, such as raindrop-shaped protrusions 170. The vortex generators 160 can be applied in a generator stator core for cooling by punching the raindrop-shaped protrusions 170 on laminations 162. Other possible ways of forming the protrusions are possible. Referring to FIG. 10, the raindrop-shaped body 172 is characterized by radius r at the leading edge, height e, and length l. The body of each raindrop-shaped protrusion has a round end 174 and a pointed end 176. The pointed end is orientated to the flow downstream with respect to the cooling flow direction F.

Figure 11:
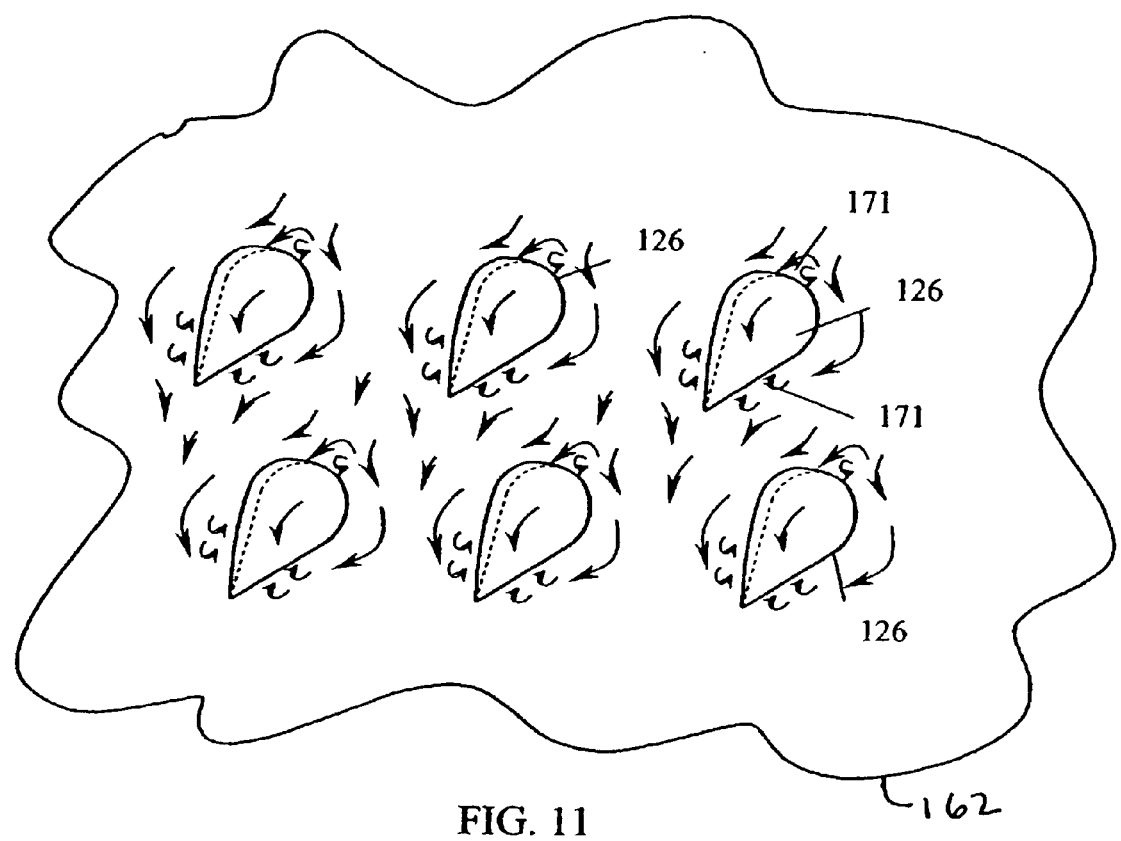
FIG. 11 is a perspective view of an illustrative flow interaction between the raindrop-shaped protrusions.

FIG. 11 illustrates a schematic example of a flow interaction between the raindrop-shaped protrusions 170. In operation as depicted in FIG. 11 with respect to a single protrusion, when the cooling gas flows over a raindrop protrusion, the gas splits at the front of the protrusion and several three dimensional horseshoe vortices 171 are generated at the either side and above the protrusion. In this arrangement, the fluid flow separates in the wake of the protrusion. In one arrangement of a plurality of raindrop-shaped protrusions, the protrusions can be located on an off-axis or alternating row arrangement. Advantageously, the alternating arrangement of the raindrop protrusions disrupts the flow to greatly increase the interaction between the flow components, including wake interference. Accordingly, this interaction with three-dimensional flow disturbances significantly enhances heat transfer. The generated three-dimensional vortices can maximize the heat transfer rate between the heated surfaces and cooling gas to improve heat transfer from both laminations forming the cooling channel. With the different vortex generator arrangements, fully development three-dimensional vortices are generated to maximize heat convection in the cooling channel and eliminate hot spots. The vortex generation and propagation highly disturbs the cooling gas flow and greatly enhances the surface heat transfer coefficient in relation to the lamination.

An efficient and cost-effective way of imparting disturbances to the cooling flow is to employ vortex generators 160 in combination with the knurled space blocks. Referring to the arrangement illustrated in FIG. 12, due to the undulations of the space block, the cooling gas is influenced to periodically change its direction along the flow path adjacent to sidewall 114 of space blocks 110. This causes local flow separation disturbances and subsequent reattachment of gas flow in the boundary layer. In addition, the knurled sidewalls of the space blocks provide further disturbances to the cooling flow to maximize the heat transfer rate between the heated surfaces and the cooling fluid, gas or liquid. Thus, additional heat is removed from the generator stator core.

Figure 12:
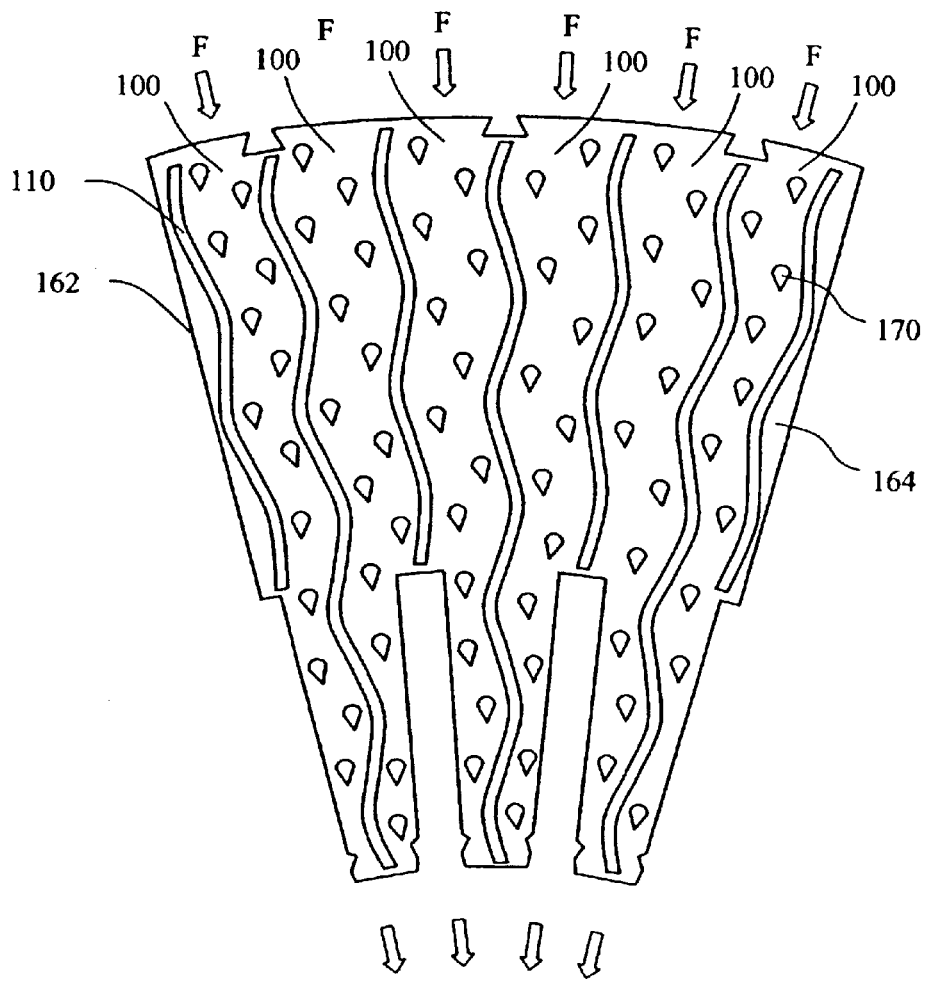
FIG. 12 is a partial side elevation view of a lamination stator core assembly with undulating space blocks with vortex generators of FIG. 10 according to the teachings of the present invention.

FIG. 12 further illustrates an arrangement of the raindrop-shaped vortex generators 170 within the channels formed between two adjacent space blocks 110 and at least two laminations 162. It should be appreciated that the vortex generators in alternating row arrangement can provide a higher beat transfer rate than that in an inline arrangement. The orientation of each vortex generator varies according to the direction of the local cooling gas flow F. In this way, the cooling gas flow is greatly disturbed so that a desired maximum cooling capacity can be achieved.

The aspects of the present invention contemplate multiple roughness structures which reduce the thickness of boundary layer adjacent to the space block sidewalls and thus increase cooling capacity. The roughness structures may include knurled structures on the space block. Any combination of a knurling structure is contemplated to be within the scope of the present invention. Any such arrangements with the addition of variously shaped vortex generator are also within the purview of the invention.

The space blocks in the illustrated embodiments can be extruded or molded using conventional manufacturing processes. While the manufacturing costs are slightly higher than the cost for the making conventional space blocks, improved heat transfer increases the generator stator core life as measured by the number of operational hours. Also, it should be noted that reducing the cost over the life of the stator core is a further benefit. Thus, optimizing the space block cross section profiles can improve the thermal performance of the stator core increasing the first cost but also advantageously reducing the life cycle cost on the stator core. The roughness structure with knurled profiles may also be used advantageously with conventionally arranged straight space to increase heat transfer by changing the cross-sectional shape.

The aspects of the present invention can replace the straight and/or smooth space blocks that have used for several decades for stator cores. In particular, the aspects of the present invention can be applied to electrical machines with cooling channels using fluidic materials, liquid or gas. The gases may include hydrogen or ambient air depending on the cooling characteristics for the intended use of the machine. These machines can range from small electric generators for residents to large generators for regional power distribution. In addition to the previously discussed advantages, the aspects of the present invention increases the cooling capacity at the stator core, reduces hot spots, and thusly, increase the generator output rating. The embodiments shown of the present invention can be implemented with conventional assembly methods for generator stator cores.

While the invention has been described with reference to preferred and exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

What is claimed is:

1. A generator stator core, comprising:
    at least two laminations being adjacent; and
    at least two space blocks extending on radially disposed between the laminations adapted to define a ventilation duct, wherein at least one space block includes a plurality of thermal roughness members disposed in a side surface of the at least one space block, the thermal roughness members being adapted to impart local flow disruptions in a fluid flowing along the side surface of the at least one space block for increasing the effective heat transfer coefficient.

2. The generator stator core in accordance with claim 1, wherein the thermal roughness members further comprises a plurality of thermal ribs being adjacent to each other.

3. The generator stator core in accordance with claim 2, wherein the thermal ribs are adapted for substantial bi-directional flow of the fluid towards the two laminations.

4. The generator stator core in accordance with claim 2, wherein the thermal ribs are adapted for substantial bi-directional flow of the fluid generally towards a central radial axis of the at the least one space block.

5. The generator stator core in accordance with claim 2, wherein the thermal ribs include at least one thermal rib having a first portion attached to opposing two ribs legs extending away from the first portion.

6. The generator stator core in accordance with claim 2, wherein the thermal ribs include at least one thermal rib having a raindrop shape construction.

7. The generator stator core in accordance with claim 2, wherein the thermal ribs includes at least one thermal ribs having an hemispherical construction.

8. The generator stator core in accordance with claim 1, wherein the least one space block or the other space block includes a thermal orifice adapted to allow the cooling to flow therethrough.

9. The generator stator core in accordance with claim 1, wherein the at least one space block include a wavy longitudinal profile.

10. The generator stator core in accordance with claim 1, further comprising a plurality of vortex generators disposed on at least one lamination, the vortex generators being adapted to impart vorties in the fluid flow.

11. The generator stator core in accordance with claim 10, wherein at least one of the vortex generators is selected from a group comprising a wedge shape, a hemispherical shape, a delta shape, and a raindrop shape.

12. The generator stator core in accordance with claim 10, wherein the vortex generators are disposed in a plurality of alternating rows on the least one lamination.

13. The generator stator core in accordance with claim 1, wherein said roughness members comprises a plurality of dimples.

14. The generator stator core in accordance with claim 13, wherein the dimples are raindrop shaped having a rounded end and an opposing pointed end, said pointed end being a downstream of the rounded end.

15. The generator stator core in accordance with claim 13, wherein the dimples are hemispherically shaped.

16. A generator stator core, comprising:
    at least two laminations being adjacent; and
    at least two space blocks being adjacent and extending on radially in the generator stator core, the space blocks being disposed between the laminations adapted to define a ventilation duct for a fluid to flow therethrough, wherein at least one of space blocks includes a plurality of thermal orifices disposed in a side surface of the space block and the thermal orifices being adapted to enable a portion of the fluid to flow therethrough from the ventilation duct.

17. The generator stator core in accordance with claim 16, wherein the at least one of the space blocks or the other space block includes a web member disposed between opposing flanges members, and a plurality of thermal roughness elements are disposed in the web member so as to provide flow disruptions in the fluid flowing in the ventilation duct.

18. The generator stator core in accordance with claim 17, wherein the thermal roughness elements comprise thermal ribs.

19. The generator stator core in accordance with claim 16, wherein thermal ribs are formed by a knurling process.

20. A space block for forming radially disposed ventilation ducts in a generator stator core, the space block comprising a sidewall having a heat transfer surface including a plurality of spaced ribs adapted to reduce a thickness of a boundary layer of the fluid flowing along the sidewall.

21. The space block in accordance with claim 20, wherein the each of die ribs comprise a general V-shape having an apex attached to a first leg and a second leg extending therefrom, the first leg and the second leg being disposed downstream of the apex with respect to a fluid flow direction along the space block.

22. The space block in accordance with claim 21, wherein the apex is coincident with a central radial axis of the space block, each of the first leg and the second leg being disposed at an angle with respect to the central radial axis.

23. The space block in accordance with claim 22, wherein the angle is between 45 degrees and 90 degrees.

24. The space block in accordance with claim 20, wherein the each of the ribs comprise a general V-shape having an apex attached to a first leg and a second leg extending therefrom, the first leg and the second leg being disposed upstream of the apex with respect to a fluid flow direction along the space block.

25. The space block in accordance with claim 23, wherein the ribs are generally web-shaped having a plurality of left oblique ribs and a plurality of right oblique ribs.

26. A generator stator core, comprising:

at least two laminations; and a plurality of space blocks extending radially in the generator stator core, the space blocks being disposed between the laminations adapted to define a ventilation duct between adjacent space blocks fix a fluid to flow through, wherein at least one of the space blocks of the ventilation duct includes a knurled surface forming a non-planar surface profile for enhanced heat transfer to the fluid from the space block.

27. The generator stator core in accordance with claim 26, wherein the knurled surface includes a plurality of ribs having a rib density of 3 to 180 ribs per centimeter.

28. The generator stator core in accordance with claim 27, wherein the knurled surface includes a plurality of ribs having a ribs density of 10 to 100 ribs per centimeter.

29. A generator stator core, comprising:

a plurality of laminations; and at least two of space blocks extending radially disposed between the laminations defining a ventilation duct therebetween for a fluid to flow through, at least one of the laminations define the ventilation duct includes a plurality of dimples extending into the fluid, the thermal dimples being adapted to impart vortices to the fluid flowing in the ventilation duct.

30. The generator stator core in accordance with claim 29, wherein the thermal dimples have a raindrop shape construction.

31. The generator stator core in accordance with claim 29, wherein the thermal dimple have a hemispherical shape construction.

32. The generator stator core in accordance with claim 29, wherein the thermal dimples are disposed on the at least one of the laminations in a plurality of rows being off-axis to one other.

* * * * *

UNITED STATES PATENT AND TRADEMARK OFFICE
CERTIFICATE OF CORRECTION

PATENT NO. : 6,777,836 B2  Page 1 of 1
DATED : August 17, 2004
INVENTOR(S) : Wei Tong et al.

It is certified that error appears in the above-identified patent and that said Letters Patent is hereby corrected as shown below:

Column 10,
Line 41, please replace "beat" with -- heat --

Column 11,
Line 66, please replace "include" with -- includes --

Column 12,
Line 48, please replace "die" with -- the --

Column 13,
Line 6, please replace "fix" with -- for --

Signed and Sealed this

Fourteenth Day of December, 2004

JON W. DUDAS
*Director of the United States Patent and Trademark Office*